June 2, 1970 — F. V. PONTERIO — 3,515,004
FLUID JET ACCELEROMETER
Filed Feb. 6, 1967 — 2 Sheets-Sheet 1
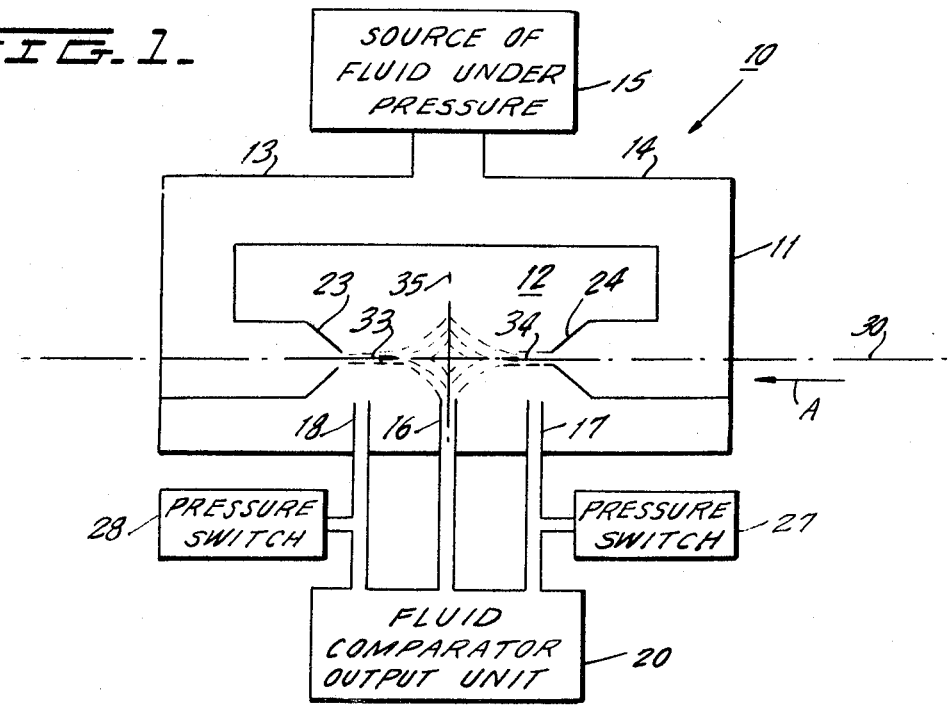

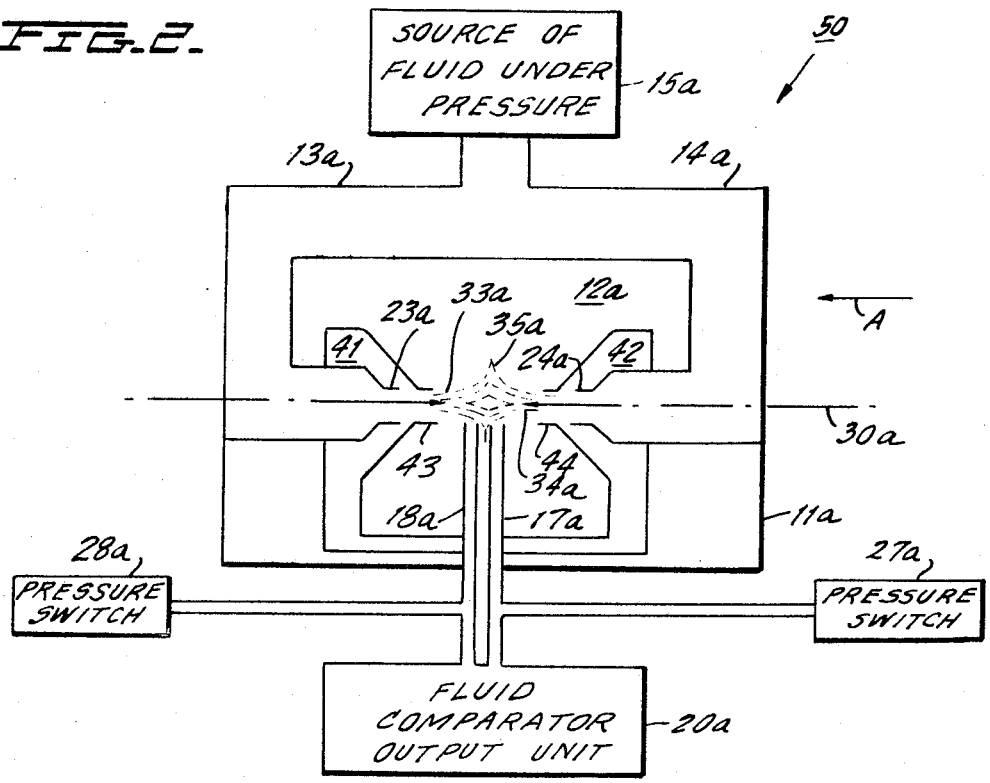
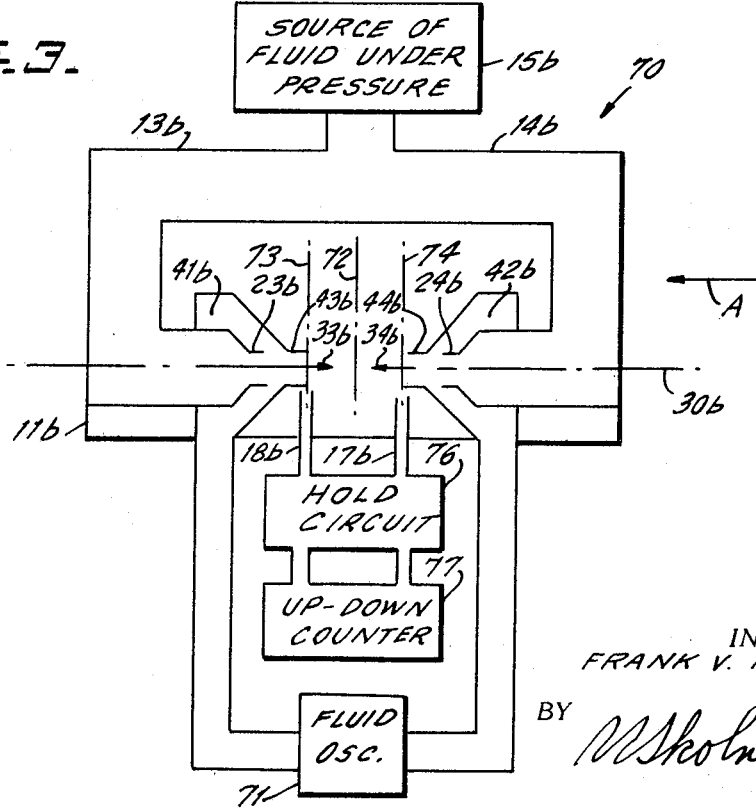

United States Patent Office 3,515,004
Patented June 2, 1970

3,515,004
FLUID JET ACCELEROMETER
Frank V. Ponterio, Staten Island, N.Y., assignor to Sperry Rand Corporation, Long Island City, N.Y., a corporation of Delaware
Filed Feb. 6, 1967, Ser. No. 614,171
Int. Cl. G01p 15/02
U.S. Cl. 73—515    10 Claims

ABSTRACT OF THE DISCLOSURE

An accelerometer having opposed fluid jets acting along the measuring axis to form a fluid plane perpendicular to this axis, with such plane constituting the acceleration detecting element. In one embodiment, auxiliary flow means is provided to modify the jets for improved linearity in output pressure versus acceleration and to increase dynamic range. In another embodiment, the output signal is pulse length modulated to provide a more readily integrated output.

---

This invention relates to acceleration detecting instruments and more particularly relates to an accelerometer which does not have any mechanical moving parts but utilizes a fluid plane as the acceleration detecting element.

For the most part, accelerometers of the prior art have utilized one or more movable mechanical elements as the acceleration sensing means. These elements must be capable of translatory or rotary motion and means, usually in the form of an elastic constraint, must be provided for restoring such element or elements toward a neutral position as acceleration forces decrease.

In order to provide a low cost, highly reliable accelerometer capable of long operating and storage life, the instant invention provides a construction which does not have any moving mechanical parts. More particularly, the device of the instant invention produces a fluid plane disposed perpendicular to the measuring axis and detects motion of this fluid plane relative to the device frame along the measuring axis to determine acceleration. As will hereinafter be explained in detail, such fluid plane is formed at the intersection of opposed fluid jets directed along the measuring axis.

In a construction of this type dynamic range is increased and output linearity improved by utilizing feedback pressures developed by fluid flow in the fluid plane to modify fluid pressure provided by a main source of fluid under pressure. In another construction fluid pressure provided by the main source of fluid under pressure is combined with the output of a fluid oscillator so that the fluid plane oscillates back and forth along the measuring axis. Under conditions of acceleration oscillatory movement of the fluid plane is modified to produce a pulse width modulated output which may readily be integrated.

Accordingly, a primary object of the instant invention is to provide a novel accelerometer which does not have any mechanical moving parts.

Another object is to provide a novel accelerometer which will perform satisfactorily in extreme temperature, shock, vibration and radiation environments.

Still another object is to provide a novel precision accelerometer which is of relatively low cost, is highly reliable, and possesses long operating and storage lives.

A further object is to provide a fluid accelerometer of this type having novel feedback means to improve output linearity and provide increased dynamic range.

A still further object is to provide a fluid accelerometer of this type in which the fluid plane is made to oscillate along the measuring axis under conditions of zero acceleration with this oscillation being modified under conditions of acceleration to produce a pulse width modulated output.

These, as well as other objects of the instant invention will become readily apparent after reading the following description of the accompanying drawings in which:

FIG. 1 is a schematic representation of a basic fluid jet accelerometer constructed in accordance with the teachings of the instant invention.

FIG. 2 is a schematic similar to FIG. 1 showing a modified fluid jet accelerometer construction in which feedback is utilized to improve output linearity and increase dynamic range.

FIG. 3 is a schematic similar to FIG. 1 showing a modified fluid jet accelerometer construction in which output of a fluid oscillator acts on the jets to produce a pulse width modulated output.

FIGS. 4A, 4B and 4D are diagrams of idealized pressure developed directly by the fluid plane at the output ports under different conditions. In FIG. 4A there is zero acceleration, in FIG. 4B acceleration is in one direction while in FIG. 4D acceleration is in the reverse direction.

FIGS. 4C and 4E are diagrams showing pulse width modulated signals resulting from the output shown in FIGS. 4B and 4D, respectively.

Now referring to FIG. 1. Accelerometer 10 includes frame 11 defining feeding chamber 12. Conduits 13, 14 connect source 15 of fluid under pressure to the inputs of nozzles 23, 24, respectively. Nozzles 23, 24 are disposed along measuring axis 30 and direct fluid flow in opposite directions into chamber 12. Taps 16, 17, 18 connect chamber 12 to fluid comparator output unit 20. Pressure switches 27, 28 are connected to taps 17, 18, respectively.

Operation of accelerometer 10 proceeds as follows. Fluid, such as pressurized air from source 15 passes through conduits 13, 14 emerging from nozzles 23, 24 in chamber 12 as fluid jets 33, 34, respectively. Jets 33, 34 flow along measuring axis 30 in opposite directions toward one another and meet, with the resultant fluid flow being radial at this point of intersection to form fluid plane 35 positioned perpendicular to measuring axis 30. The position of fluid plane 35 along measuring axis 30 is that position at which the sum of the momenta of jets 33, 34 is zero. For equal size jets this condition is satisfied where the jet velocities are of equal magnitude and in opposite directions.

In the analysis of fluid jet devices, it is commonly assumed that the momentum of a jet remains constant for a distance of several nozzle diameters downstream. If this were absolutely true, the location of the plane of intersection of two jets could not be determined since fluid forces have no unique point of application. However, momenta of jets decrease with downstream distance due to unavoidable losses brought about by viscous shear of the jets with the quiescent surroundings. Accordingly, the location of the plane of intersection of the jets is uniquely defined in that the momenta of the jets will be equal at only one point.

Assuming that jets 33, 34 emerge from nozzles 23, 24 with equal velocities, jets 33, 34 will intersect midway between nozzles 23, 24. Tap 16 is midway between nozzles 23, 24 so that under conditions of zero acceleration the radial flow in fluid plane 35 resulting from the collision of jets 33, 34 will be centered over tap 16. Stagnation pressure in tap 16 will rise to a value related to jet velocity and fluid density. Taps 17, 18 are so positioned that under conditions of zero acceleration, stagnation pressures in taps 17, 18 will be essentially zero.

When frame 11 is accelerated parallel to measuring axis 30 in the direction indicated by arrow A, the position of fluid plane 35 relative to frame 11 will shift away from tap 16 toward tap 17. At a particular acceleration level, fluid plane 35 will be centered over tap 17 and under such conditions pressure in tap 17 will reach a maximum value and pressure in tap 16 will be essentially zero.

As fluid plane 35 moves from tap 16 to tap 17, pressure in tap 16 will gradually decrease while the pressure in tap 17 will gradually increase. The differential pressure between taps 16 and 17 is detected by fluid comparator output unit 20 to produce a continuous measure of acceleration. Pressure switch 27 connected to tap 17 is actuated when the pressure in tap 17 reaches a predetermined value with the output of switch 27 being used to perform any desired function. In the alternative, pressure switch 27 may be a proportional device used to provide varying control depending upon the pressure in tap 17.

Similarly, accelerations of frame 11 along measuring axis 30 in a direction opposite to that indicated by arrow A will result in a movement of fluid plane 35 away from tap 16 toward tap 18. Pressure at tap 16 will decrease while the pressure at tap 18 will increase. Actuation of pressure switch 28 is controlled by the magnitude of pressure at tap 18.

It should now be obvious to those skilled in the art that the teachings of the instant invention as shown in FIG. 1 may be used to provide both analog and digital outputs by arranging a series of output taps along the measuring axis.

Accelerometer 50 of FIG. 2 contains the same basic elements as accelerometer 10 of FIG. 1 with the addition of means for improving linearity in output pressure versus acceleration and increasing the dynamic range of the accelerometer. Where elements shown in FIG. 2 are substantially the same as and perform the same functions as corresponding elements in FIG. 1, the elements of FIG. 2 bear the same reference numerals as those of FIG. 1 with the addition of the suffix "a" and no further description thereof will be given.

In addition to main chamber 12a wherein fluid plane 35a is formed, frame 11a defines mixing chambers 41, 42 coaxial with main jet nozzles 23a, 24a, respectively. The construction of control chambers 41, 42 is such that fluid flowing into these chambers from taps 18a, 17a, respectively, mixes with fluid issuing from nozzles 23a, 24a to form combined jets 33a, 34a, respectively, flowing in opposite directions toward one another along measuring axis 30a. At the intersection of jets 33a, 34a radial flow forms fluid plane 35a perpendicular to measuring axis 30a.

Under conditions of zero acceleration, fluid plane 35a is located midway between nozzles 41a, 42a and equal flows are induced in output taps 17a, 18a and pressures within the output taps 17a, 18a are equal so that fluid comparator output unit 20a senses zero differential pressure.

If accelerometer 50 experiences acceleration in the direction of arrow A, fluid plane 35a shifts to the right with respect to frame 11a. In so doing, pressure within output tap 17a increases while pressure in output tap 18a decreases. This is accompanied by increased flow into control chamber 42 and decreased flow into control chamber 41. As a result, the momentum of jet 34a increases and the momentum of jet 33a decreases thereby effectively shifting fluid plane 35a back toward its centered position. Similarly, an acceleration in the direction opposite to that of arrow A tends to shift fluid plane 35a closer to output tap 18a.

Thus, it is seen that the resulting pressure differential between output taps 17a, 18a has the effect of urging fluid plane 35a back to its midposition. More particularly, under conditions of acceleration along measuring axis 30a, feedback from taps 17a, 18a to control chambers 42, 41 respectively, tends to maintain output flow centered between nozzles 43, 44 except for a small displacement required to establish a differential pressure between output taps 17a, 18a. Output flow position establishes a pressure differential between taps 17a, 18a with such output flow having its algebraic sign and magnitude determined by the magnitude and direction of the input acceleration.

In the embodiment of FIG. 3 those elements having substantially the same constructions and functions as corresponding elements of FIG. 2 are designated by like reference numerals with the suffix "b" and no additional description thereof is given herein. Accelerometer 70 of FIG. 3 provides a pulse length modulated output signal which may be integrated more readily than the outputs of accelerometers 10 and 50. More particularly, control chambers 41b, 42b are both fed by fluid oscillator 71. Thus, the momenta of jets 33b, 34b issuing from nozzles 43b, 44b, respectively, are each the sum of momenta of a main power jet fed from source 15b and an oscillating control flow fed from oscillator 71.

Under conditions of zero acceleration, the radial output plane (fluid plane of intersection of jets 33b, 34b) is caused to move with an oscillatory motion along measuring axis 30b, because of the output from oscillator 71, between the limits indicated by locations 73 and 74 positioned symetrically on opposite sides of midposition 72. Output taps 17b, 18b are positioned at extreme locations 74, 73, respectively. FIG. 4A shows the idealized pressure outputs at taps 17b, 18b under conditions of zero acceleration.

When accelerometer 70 is subjected to an acceleration in the direction indicated by arrow A, the resultant inertial reaction force acting on jets 33b, 34b tends to accelerate the radial output fluid plane toward output taps 34b. The motion of the radial output fluid plane is determined by the algebraic sum of the unidirectional inertial reaction force and the oscillating fluid force produced by oscillator 71. As this fluid plane moves from tap 18b toward tap 17b, such plane is acted upon by the arithmetic sum of these two forces. As this fluid plane moves from tap 17b toward tap 18b, this plane is acted upon by the arithmetic difference of these forces.

The transit time for the radial fluid plane going from tap 18b to tap 17b is therefore less than the transit time going from tap 17b to tap 18b. Idealized outputs of taps 18b, 17b for such cases are shown in FIG. 4B. Tape 17b, 18b are connected to zero order hold circuit 76 which produces a pulsed output with pulse duration determined by transit time for the radial fluid plane. The corresponding outputs of hold circuit 76 are shown in FIG. 4C. These outputs are used to gate an up and down counter 77 to provide the desired integration. FIGS. 4D and 4E show corresponding outputs for an acceleration opposite to the direction indicated by arrow A.

Thus, it is seen that the instant invention provides a novel accelerometer construction which does not require any moving mechanical parts. Only fluid pressure is required for operation of the accelerometer.

Although there has been described a preferred embodiment of this novel invention, many variations and modifications will now be apparent to those skilled in the art. Therefore, this invention is to be limited, not by the specific disclosure herein, but only by the appending claims.

What I claim is:

1. An accelerometer for detecting acceleration along a measuring axis, said accelerometer including a frame, first and second means mounted to said frame for creating, respective, first and second fluid jets flowing along said axis, said jets directed toward each other to produce radial fluid flow in a fluid plane at their point of intersection, said fluid plane extending perpendicular to said axis, pickup means to detect changes in position of said fluid plane along said axis relative to said frame as said frame is accelerated along said axis and means connected to said pickup means to produce a measure of acceleration of said frame along said axis.

2. An accelerometer as set forth in claim 1 in which said frame defines a chamber into which said jets flow, said pickup means including output tap means extending externally of said chamber and positioned to pick up pressure generated by fluid flow in said fluid plane, and output means connected to said output tap means to detect pressure thereat and thereby produce a signal related to acceleration of said frame along said axis.

3. An accelerometer as set forth in claim 2 in which said first and second means include a source of fluid under pressure fed to the input sides of nozzles having output sides communicating with said chamber, said nozzles disposed on opposite sides of said fluid plane.

4. An accelerometer as set forth in claim 3 in which said tap means includes a first portion spaced along said axis in a first direction from the position occupied by said fluid plane under conditions of zero acceleration whereby pressure increases in said first portion in relation to acceleration of said frame along said axis in a second direction opposite to said first direction.

5. An accelerometer as set forth in claim 4 in which said tap means also includes a second portion spaced along said axis in said second direction from the position occupied by said fluid plane under conditions of zero acceleration whereby pressure increases in said second portion and decreases in said first portion in relation to acceleration of said frame along said axis in said first direction.

6. An accelerometer as set forth in claim 5 in which under conditions of zero acceleration said fluid plane is disposed midway between said nozzles and pressures in said first and second portions are equal.

7. An accelerometer as set forth in claim 1 in which first and second means include respective, first and second control chambers having respective first and second output nozzles, a main source feeding main fluid under pressure to said control chambers and an auxiliary source for feeding control fluid under pressure to said chambers wherein said main and control fluids combine and thereafter issue through said first and second output nozzles as said first and second fluid jets, respectively.

8. An accelerometer as set forth in claim 7 in which said auxiliary source includes a fluid oscillator whereby said fluid plane is caused to oscillate along said measuring axis and said pickup means detects a pulsed signal resulting from such oscillatory movement of said fluid plane.

9. An accelerometer as set forth in claim 8 in which said means connected to said pickup means includes circuit means for transforming said pulsed signal into a pulse length modulated output signal.

10. An accelerometer as set forth in claim 7 in which the auxiliary source includes means connecting said output means to said control chambers whereby said control fluid under pressure acts to impede normal relative motion between said fluid plane and said jet due to acceleration forces acting on said accelerometer.

References Cited

UNITED STATES PATENTS

| | | | |
|---|---|---|---|
| 3,228,410 | 1/1966 | Warren et al. | 137—81.5 |
| 3,272,215 | 9/1966 | Bjornsen et al. | 137—81.5 |
| 3,282,280 | 11/1966 | Horton | 137—81.5 |
| 3,323,532 | 6/1967 | Campagnuolo | 137—81.5 |

JAMES J. GILL, Primary Examiner

H. GOLDSTEIN, Assistant Examiner

U.S. Cl. X.R.

137—81.5